US006228911B1

(12) United States Patent
Gilg

(10) Patent No.: US 6,228,911 B1
(45) Date of Patent: May 8, 2001

(54) LIGHT-STABILIZED FLAMEPROOF STYRENE HOMOPOLYMERS AND COPOLYMERS

(75) Inventor: Bernard Gilg, St. Louis-la-Chaussée (FR)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 09/331,471

(22) PCT Filed: Dec. 12, 1997

(86) PCT No.: PCT/EP97/06917

§ 371 Date: Jun. 21, 1999

§ 102(e) Date: Jun. 21, 1999

(87) PCT Pub. No.: WO98/28361

PCT Pub. Date: Jul. 2, 1998

(30) Foreign Application Priority Data

Dec. 23, 1996 (EP) .................................................. 96810889

(51) Int. Cl.[7] ...................... C08K 5/3475; C08K 5/3432; C08K 5/1515; C08K 3/10; C08K 5/02
(52) U.S. Cl. .............................. 524/91; 524/99; 524/100; 524/114; 524/371; 524/412; 524/466
(58) Field of Search ................................ 524/91, 99, 100, 524/114, 412, 466, 371

(56) References Cited

U.S. PATENT DOCUMENTS

| 3,210,304 | 10/1965 | Eirich et al. | 260/23 |
|---|---|---|---|
| 4,812,494 | 3/1989 | Nagasaki et al. | 524/91 |
| 5,900,446 | * 5/1999 | Nishihara et al. | 524/127 |

FOREIGN PATENT DOCUMENTS

| 622502 | 3/1963 | (BE) . |
|---|---|---|
| 2042561 | 9/1980 | (GB) . |

OTHER PUBLICATIONS

Patent Absracts of Japan Publication No. 07224205, 8/95.
Patent Abstracts of Japan Publication No. 03292351, 12/91.
Derwent Abstr. 93–375601 for RD 354035, 10/93.
Searle et al, Journal of Polymer Science: Part A: Polymer Chemistry, vol. 27, pp. 1341–1357 (1989).
Landry et al, Ethyl Corporation, Improvements in the UV resistance of flame–retarded styrenics: an experimental design approach.

* cited by examiner

Primary Examiner—Tae H. Yoon
(74) Attorney, Agent, or Firm—Tyler A. Stevenson; Luther A. R. Hall

(57) ABSTRACT

The invention relates to a composition comprising a) a styrene, α-methylstyrene or p-methylstyrene homo- or copolymer; b) a bromine-containing flame retardant; c) a UV absorber; d) a sterically hindered amine and e) an epoxidized fatty acid. This invention also relates to the use of the light stabilizer mixture consisting of the components c), d) and e) for light-stabilizing a styrene, α-methylstyrene or p-methylstyrene homo- or copolymer finished with a bromine-containing flame retardant as well as to a process for the light-stabilization thereof. Adding an epoxidized fatty acid to a UV absorber and a sterically hindered amine in styrene, α-methylstyrene or p-methylstyrene homo- or copolymer finished with bromine-containing flame retardants results in an unexpected synergistic effect in the light stability. In particular, it is possible to markedly reduce the discoloration of the finished polymer which takes place in the course of irradiation.

16 Claims, No Drawings

LIGHT-STABILIZED FLAMEPROOF STYRENE HOMOPOLYMERS AND COPOLYMERS

The present invention relates to a composition, comprising a) a styrene, α-methylstyrene or p-methylstyrene homo- or copolymer, b) a bromine-containing flame retardant, c) a UV absorber, d) a sterically hindered amine and e) an epoxidised fatty acid. This invention also relates to the use of the light stabiliser mixture consisting of components c), d) and e) for light-stabilising a styrene, α-methylstyrene or p-methylstyrene homo- or copolymer finished with a bromine-containing flame retardant as well as to a process for the light-stabilisation thereof.

Styrene homo- and copolymers are often used as housings for electrical or electronic apparatus, such as computers or television sets, as packaging materials or also in the manufacture of automobiles.

Housings of electrical or electronic apparatus require flameproofing especially because electrostatic charges, bad electrical contacts or separating electrical connections may start a fire. Bromine-containing flame retardants have been found to be particularly suitable in this case.

When flameproofing housings it is often important, for aesthetic reasons, that the flame retardants cause as little discoloration as possible and that this discoloration does not increase under the influence of light and heat during use. This often requires the use of a UV/light stabiliser or UV absorber.

The light-stabilisation of styrene-containing polymers with sterically hindered amines and UV absorbers has been known for a long time and has been described, inter alia, by N. D. Searle et al. in J. Polym. Sci.: Part A: Polym. Chem., Vol. 27, 1341–1357 (1989). The light-stabilisation of flameproofed styrene polymers/copolymers is described, inter alia, by S. D. Landry et al. in Annual Technical Meeting of the Society of Plastic Engineers, New Orleans May 9–13, 1993 as well as, by the same authors, in a company publication of the Ethyl Corporation 8000 GSRI AVE Baton Rouge, La. 70820.

Surprisingly, it has now been found that adding an epoxidised fatty acid to a UV absorber and a sterically hindered amine in styrene, α-methylstyrene or p-methylstyrene homo- or copolymers finished with bromine-containing flame retardants results in an unexpected synergistic effect in light stability. In particular, it is possible to markedly reduce the discoloration of the finished polymer which takes place in the course of irradiation.

In one of its aspects, this invention accordingly relates to a composition, comprising a) a styrene, α-methylstyrene or p-methylstyrene homo- or copolymer, b) a bromine-containing flame retardant, c) a UV absorber, d) a sterically hindered amine and e) an epoxidised fatty acid.

Typical examples of homopolymers are polystyrene, poly(p-methylstyrene) and poly(α-methylstyrene).

Preferred copolymers are those of styrene or α-methylstyrene with dienes or acryl derivatives, for example styrene/butadiene, styrene/acrylonitrile, styrenelalkyl methacrylate, styrene/butadiene/alkyl acrylate and styrene/butadiene/methacrylate, styrene/maleic acid anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene isoprene/styrene, styrene/ethylene/butylene/styrene or styrene/ethylene/propylene/styrene.

Also important are graft copolymers of styrene or α-methylstyrene, for example styrene on polybutadiene, styrene on polybutadiene/styrene or polybutadienelacrylonitrile copolymers, styrene and acrylonitrile (or methacrylonitrile) on polybutadiene; styrene, acrylonitrile and methyl methacrylate on polybutadiene; styrene and maleic acid anhydride on polybutadiene; styrene, acrylonitrile and maleic acid anhydride or maleic acid imide on polybutadiene; styrene and maleic acid imide on polybutadiene, styrene and alkyl acrylates or alkyl methacrylates on polybutadiene, styrene and acrylonitrile on ethylene/propylene/diene terpolymers, styrene and acrylonitrile on polyalkyl acrylates or polyalkyl methacrylates, styrene and acrylonitrile on acrylate/butadiene copolymers, as well as mixtures thereof with the copolymers cited above, for example the copolymer mixtures known as ABS, MBS, ASA or AES polymers.

The copolymers can be obtained as random copolymers or as block copolymers. Mixtures or random copolymers and block copolymers may also be obtained.

Polybutadiene-modified polystyrenes are often used for housings of electrical or electronic apparatus. These polystyrene types are known as impact-modified polystyrene. These are particularly preferred within the scope of this invention. A particularly preferred modification are acryl/butadiene/styrene copolymers (ABS).

Bromine-containing flame retardants are mentioned, inter alia, in Gächter/Müller Taschenbuch der Kunststoffadditive, Carl Hanser Verlag, 1983, pages 561–564.

To be mentioned as examples are: decabromodiphenyl oxide, octabromodiphenyl oxide, tetrabromodiphenyl oxide, tetrabromobisphenol A, hexabromocyclododecane, bis(tribromophenoxy)ethane, tribromophenol, ethylene-bis-tetrabromophthalimide, tetrabromobisphenol A polycarbonate oligomer, polystyrene bromide, tetrabromobisphenol A epoxy oligomer, ethylene-bis-pentabromodiphenyl, tris(tribromophenoxy)triazine.

Preferred flame retardants are ethylene-bis-pentabromodiphenyl and ethylene-bis-tetrabromophthalimide.

The flame retardants can be added in the conventional known amounts of e.g. 1 to 30% by weight, preferably of 5 to 20% by weight, based on the polymer.

Heavy metal oxides may be used as so-called synergists (Gächter/Müller Taschenbuch der Kunststoffadditive, Carl Hanser Verlag, 1983, pages 564–565). These are preferably $Sb_2O_3$ or $Sb_2O_5$. The heavy metal oxides are normally used in an amount of 0.5 to 10% by weight, preferably of 1 to 5% by weight, based on the polymer.

The flame retardants are known and are commercially available from different producers.

Examples of UV absorbers c) are:

2.1. 2-(2'-Hvdroxyphenyl)benzotriazoles, for example 2-(2'-hydroxy-5'-methylphenyl)-benzotriazole, 2-(3',5'-di-tert-butyl-2'-hydroxyphenyl) benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-ditert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(a,a-dimethylbenzyl)-2'-hydroxyphenyl)benzotriazole, 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5- chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl) phenyl)benzotriazole, 2-(3'-tert-butyl-2'-hydroxy-5'-(2-octyloxy-carbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylene-bis-[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole wit h polyethylene glycol 300; [R—CH$_2$CH$_2$—COO—CH$_2$CH$_2$-]$_2$ where R=3'-tert-butyl-4'-hydroxy-5'-2H-benzotriazol-2-ylphenyl, 2-[2'-hydroxy-3'-(α,α-dimethylbenzyl)-5'-(1,1 ,3,3-tetramethylbutyl)phenyl]benzotriazole; 2-[2'-hydroxy-3'-(1, 1,3,3-tetramethylbutyl)-5'-(α,α-dimethylbenzyl)phenyl] benzotriazole.

2.) 2-Hydroxybenzophenone, for example the 4-hydroxy, 4-methoxy, 4-octoxy, 4-decyloxy, 4-dodecyloxy, 4-benzyloxy, 4,2',4'-trihydroxy, 2'-hydroxy-4,4'-dimethoxy derivative.

3.) Esters of unsubstituted or substituted benzoic acids, for example 4-tert-butyl-phenyl salicylate, phenyl salicylate, octylphenyl salicylate, dibenzoyl resorcinol, bis(4-tert-butylbenzoyl) resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

4.) Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate and N-(β-carbomethoxy-β-cyanovinyl)-2-methylindoline.

5.) Oxamides, for example 4,4'-di-octyloxyoxanilide, 2,2'-diethoxyoxanilide, 2,2'-dioctyloxy-5,5'-di-tert-butyloxanilide, 2,2'-didodecyloxy-5,5'-di-tert-butyloxanilide, 2-ethoxy-2'-ethyl-oxanilide, N,N'-bis(3-dimethylaminopropyl)oxamide, 2-ethoxy-5-tert-butyl-2'-ethyloxanilide and and its mixture with 2-ethoxy-2'-ethyl-5,4'-di-tert-butyloxanilide, mixtures of o- and p-methoxy-disubstituted oxanilides and mixtures of o- and p-ethoxy-disubstituted oxanilides.

6.) 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1, 3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis (2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxy-propyloxy) phenyl]-4,6-bis(2,4-dimethylphenyl)-1,3,5-triazine, 2-[2-hydroxy-4-(2-hydroxy-3-octyloxy-propyloxy)phenyl]-4,6-bis(2,4-dimethylphenyl)-1,3,5-triazine, 2-[4-(dodecyloxyltridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxy-propoxy)phenyl]-1,3,5-triazine, 2-(2-hydroxyphenyl)-4-(4-methoxyphenyl)-6-phenyl-1,3,5-triazine.

Preferred UV absorbers are those from the group of the 2-(2'-hydroxyphenyl)benzotriazoles and 2-(2-hydroxyphenyl)-1,3,5-triazines.

Particularly preferred are 2-(2'-hydroxy-5'-methylphenyl) benzotriazole, 2-(3',5'-di-tert-amyl-2'-hydroxyphenyl) benzotriazole and 2-(3',5'-bis(α,α-dimethylbenzyl)-2'-hydroxyphenyl)benzotriazole.

Preferred sterically hindered amines d) are piperidine compounds. These compounds contain one or more than one group of formula (I)

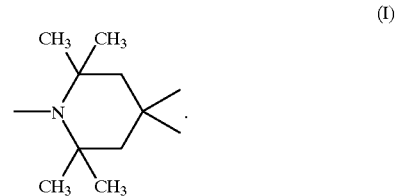

These compounds may be compounds having a relatively low molecular weight (<700) or a higher molecular weight, in which latter case they may also be oligomeric or polymeric products.

Preferred sterically hindered amines d) are:
bis(2,2,6,6-tetramethylpiperidin-4-yl)sebacate, bis(2,2,6,6-tetramethylpiperidin-4-yl)succinate, bis(1,2,2,6,6-pentamethylpiperidin-4-yl)sebacate, bis(1-octyloxy-2,2,6,6-tetramethylpiperidin-4-yl)sebacate, bis(1,2,2,6,6-pentamethylpiperidyl)-n-butyl-3,5-di-tert-butyl-4-hydroxybenzyl malonate, the condensate of 1-hydroxyethyl-2,2,6,6-tetramethyl-4-hydroxypiperidine and succinic acid, the condensate of N,N'-bis(2,2,6,6-tetramethyl-4-piperidyl) hexamethylenediamine and 4-tert-octylamino-2,6-dichloro-1,3,5-s-triazine, tris(2,2,6,6-tetramethyl-4-piperidyl) nitrilotriacetate, tetrakis(2,2,6,6-tetramethyl-4-piperidyl)-1, 2,3,4-butantetraoate, 1,1'-(1,2-ethandiyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidyl) sebacate, bis(1-octyloxy-2,2,6,6-tetramethylpiperidyl) succinate, the condensate of N,N'-bis(2,2,6,6-tetramethyl-4-piperidyl)hexamethylenediamine and 4-morpholino-2,6-dichloro-1,3,5-triazine, the condensate of 2-chloro-4,6-di(4-n-butylamino-2,2,6,6-tetramethylpiperidyl)-1,3,5-triazine and 1,2-bis(3-aminopropylamino)ethane, the condensate of 2-chloro-4,6-di(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro-[4.5]decane-2,4-dione, 3-dodecyl-1-(2,2,6,6-tetramethyl-4-piperidyi)pyrrolidine-2, 5-dione, 3-dodecyl-1-(1,2,2,6,6-pentamethyl-4-piperidyl) pyrrolidine-2,5-dione, the mixture of 4-hexadecyloxy- and 4-stearyloxy-2,2,6,6-tetramethylpiperidine, the condensate of N,N'—bis(2,2,6,6-tetramethyl4-piperidyl) hexamethylenediamine and 4-cyclohexylamino-2,6-dichloro-1,3,5-triazine, the condensate of 1,2-bis(3-aminopropylamino)ethane and 2,4,6-trichloro-1,3,5-triazine as well as 4-butylamino-2,2,6,6-tetramethylpiperidine (CAS reg. No. [136504-96-6]); N-(2,2,6,6-tetramethyl-4-piperidyl)-n-dodecylsuccinimide, N-(1,2,2,6,6- pentamethyl-4-piperidyl)-n-dodecylsuccinimide, 2-undecyl-7,7,9,9-tetramethyl-1-oxa-3,8-diaza-4-oxospiro[4,5]decane, the esterification product of 7,7,9,9-tetramethyl-2-cycloandecyl-1-oxa-3,8-diaza-4-oxospiro[4,5]decane and epichlorohydrin.

Particularly preferred are bis(2,2,6,6-tetramethylpiperidin-4-yl)sebacate, bis(2,2,6,6-tetramethylpiperidin-4-yl)succinate, bis(1,2,2,6,6-pentamethylpiperidin-4-yl)sebacate, the condensate of 2-chloro-4,6-di(4-n-butylamino-2,2,6,6-tetramethylpiperidyl)-1,3,5-triazine and 1,2-bis(3-aminopropylamino)ethane, and the condensate of 2-chloro-4,6-di(4-n-butylamino-1,2,2,6,6-pentamethylpiperidyl)-1,3,5-triazine and 1,2-bis(3-aminopropylamino) ethane.

Very particularly preferred are the condensate of 2-chloro-4,6-di(4-n-butylamino-2,2,6,6-tetramethylpiperidyl)-1,3,5-triazine and 1,2-bis(3-aminopropylamino)ethane and the condensate of 2-chloro-4,6-di(4-n-butylamino-1,2,2,6,6-pentamethylpiperidyl)-1,3,5-triazine and 1,2-bis(3-aminopropylamino)ethane.

Preferred epoxidised fatty acids are epoxidised soy bean oil, epoxidised castor oil, epoxidised sunflower oil, epoxidised linseed oil, epoxidised fish oil, epoxidised tallow.

Epoxidised soy bean oil, epoxidised castor oil, epoxidised sunflower oil or epoxidised linseed oil are particularly preferred.

Components c), d) and e) are all known and most of them are commercially available or can be prepared by analogous processes.

The UV absorbers c) are preferably added in an amount of 0.1 to 5% by weight, particularly preferably of 0.2 to 2% by weight, based on the polymer.

The sterically hindered amines d) are preferably added in an amount of 0.05 to 3% by weight, particularly preferably of 0.1 to 1% by weight, based on the polymer.

The ratio of UV absorber c) to sterically hindered amine d) is preferably from 1:10 to 10:1, particularly preferably from 1:1 to 4:1.

The epoxidised fatty acid e) is preferably added in an amount of 0.01 to 5% by weight, preferably of 0.1 to 2% by weight, based on the polymer.

Components c), d) and e) can be incorporated into the styrene, α-methylstyrene or p-methylstyrene homo- or copolymer, for example, by mixing the compounds and optional further additives into them by the customary methods of the technology. This incorporation can be carried out before or during moulding. The components can be added together or in any succession.

The components can also be added to the plastic materials to be stabilised in the form of a masterbatch which comprises them e.g. in a concentration of 2.5 to 25% by weight.

Components c), d), and e) may conveniently be incorporated by the following methods:

as dry mixture while additional components or polymer mixtures are being mixed,
by direct addition into the processing apparatus (e.g. extruders, internal mixers, kneaders, three-roll mills, calenders and the like),
as solution or melt.

The above components are preferably added direct to the processing apparatus, it being possible to prepare either masterbatches or the finished polymer compositions in this manner.

Polymer compositions of this invention can be used in different manner or can be processed to different products, for example as, or to, films, fibres, filaments, moulding compositions or profiles.

In addition to components c), d), and e), the novel compositions can comprise as additional component one or more than one conventional additive, for example the following:

1. Antioxidants 1.1. Alkylated monophenols, for example 2,6-di-tert-butyl-4-methylphenol, 2-tert-butyl-4,6-di-methylphenol, 2,6-di-tert-butyl-4-ethylphenol, 2,6-di-tert-butyl-4-n-butylphenol, 2,6-di-tert-bu-tyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl) phenol, 2,4-di-methyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl) adipate.

1.4. Tocopherols, for example α-tocopherol, β-tocopherol, γ-tocopherol, δ-tocopherol and mixtures thereof (Vitamin E).

1.5. Hydroxylated thiodiphenvi ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6tert-butyl-2-methylphenol), 4,4'-thiobis-(3,6-di-sec-amylphenol), 4,4'-bis(2,6-dimethyl-4-hydroxyphenyl)disulfide.

1.6. Alkylidenebisphenols, for example 2,2'-methylenebis (6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis( 2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy2-methylphenyl)-4-n-dodecylmercaptobutane, 1,1,5,5-tetra-(5-tert-butyl-4-hydroxy-2-methylphenyl)pentane.

1.7. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4- hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example dioctadecyl-2,2-bis-(3,5-di-tert-butyl-2-hydroxybenzyl)-malonate, di-octadecyl-2-(3-tert-butyl-4-hydroxy-5-methylbenzyl)-malonate, di-dodecylmercaptoethyl-2,2-bis-(3,5-di-tert-butyl-4-hydroxybenzyl) malonate, bis[4-(1,1,3,3-tetramethylbutyl)phenyl]-2,2-bis(3,5-di-tert-butyl-4-hydroxybenzyl)malonate.

1.9. Aromatic hydroxybenzyl compounds, for example 1,3,5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine Compounds, for example 2,4-bis (octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris-(3,5-di-tert-butyl-4-hydroxybenzyl)isocyanurate, 1,3,5-tris(4-tert-butyl-3-hydroxy-2,6-dimethylbenzyl) isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3.5-di-tert-butyl-4-hydroxyphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl) isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of β-(3,5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl) propionic acid e.g. N,N'-bis(3,5-di-tertbutyl-4-hydroxyphenylpropionyl)hexamethylenediamide, N,N'-bis (3,5-di-tert-butyl-4-hydroxyphenylpropionyl) trimethylenediamide, N,N'-bis(3,5-di-tert-butyl-4-hydroxyphenylpropionyl)hydrazine.

1.18. Ascorbic acid (vitamin C)

1.19. Aminic antioxidants, for example N,N'-di-isopropyl-p-phenylenediamine, N,N'-di-secbutyl-p-phenylenediamine, N,N'-bis(1,4-dimethylpentyl)-p-phenylenediamine, N,N'-bis(1-ethyl-3-methylpentyl)-p-phenyienediamine, N,N'-bis(1-methyl heptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenlenediamine, 4-(p-toluenesulfamoyl)diphenylamine, N,N'-dimethyl-N,N'-di-sec-butyl-p-phenylenediamine, diphenylamine, N-allyidiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino) propane, (o-tolyl)biguanide, bis[4-(1',3'-dimethylbutyl) phenyl]amine, tert-octylated N-phenyl-1-naphthylamine, a mixture of mono- and dialkylated tert-butyi/tert-octyldiphenylamine, a mixture of mono- and dialkylated nonyidiphenylamines, a mixture of mono- and dialkylated dodecyldiphenylamines, a mixture of mono- and dialkylated isopropyl/isohexyldiphenylamines, a mixture of mono- and dialkylated tert-butyidiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, N-allylphenothiazin, N, N, N',N'-tetraphenyl-1,4-diaminobut-2-ene, N,N-bis-(2,2,6,6-tetramethyl-piperid-4-yl-hexamethylenediamine, bis(2,2,6,6-tetramethylpiperid-4-yl)sebacate, 2,2,6,6-tetramethylpiperidin-4-one, 2,2,6,6-tetramethylpiperidin-4-ol.

2. Metal deactivators, for example N,N'-diphenyloxamide, N-salicylal-N'-salicyloyl hydrazine, N,N'-bis(salicyloyl) hydrazine, N,N'-bis(3,5-di-tert-butyl-4-hydroxyphenylpropionyl) hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl) oxalyl dihydrazide, N,N'-bis(salicyloyl)thiopropionyl dihydrazide.

3. Phosphites and phosphonites, for example triphenyl phosphite,.diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-bu-tylphenyl) 4,4'-biphenylene diphosphonite, 6isooctyloxy-2,4,8,10-tetra-tert-butyl-12H-dibenz[d,g]-1,3,2-dioxaphosphocin, 6-fluoro-2,4,8,10-tetra-tert-butyl-12-methyl-dibenz[d,g]-1, 3,2-dioxaphosphocin, bis(2,4-di-tert-butyl-6-methylphenyl) methyl phosphite, bis(2,4-di-tert-butyl-6-methylphenyl) ethyl phosphite.

4. Hydroxylamines, for example, N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxyiamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

5. Nitrones, for example, N-benzyl-alpha-phenyl-nitrone, N-ethyl-alpha-methyl-nitrone, N-octyl-alpha-heptyl-nitrone, N-lauryl-alpha-undecyl-nitrone, N-tetradecyl-alpha-tridcyl-nitrone, N-hexadecyl-alpha-pentadecyl-nitrone, N-octadecyl-alpha-heptadecyl-nitrone, N-hexadecylalpha-heptadecyl-nitrone, N-ocatadecyl-alpha-pentadecyl-nitrone, N-heptadecyl-alpha-heptadecyl-nitrone, N-octadecyl-alpha-hexadecyl-nitrone, nitrones derived from N,N-dialkylhydroxylamine derived from hydrogenated tallow amine.

6. Thiosynergists, for example, dilauryl thiodipropionate or distearyl thiodipropionate.

7. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

8. Polyamide stabilisers, for example, copper salts in combination with iodides and/or phosphorus compounds and salts of divalent manganese.

9. Basic co-stabilisers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example calcium stearate, zinc stearate, magnesium behenate, magnesium stearate, sodium ricinoleate and potassium palmitate, antimony pyrocatecholate or zink pyrocatecholate.

10. Nucleating agents, for example, inorganic substances such as talcum, metal oxides such as titanium dioxide or magnesium oxide, phosphates, carbonates or sulfates of, preferably, alkaline earth metals; organic compounds such as mono- or polycarboxylic acids and the salts thereof, e.g. 4-tert-butylbenzoic acid, adipic acid, diphenylacetic acid, sodium succinate or sodium benzoate; polymeric compounds such as ionic copolymers (ionomers).

11. Fillers and reinforcing agents, for example, calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

12. Other additives, for example, plasticisers, lubricants, emulsifiers, pigments, rheology additives, catalysts, flow-control agents, optical brighteners, flameproofing agents, antistatic agents and blowing agents.

13. Benzofuranones and indolinones, for example those disclosed in U.S. Pat. No. 4,325,863; U.S. Pat. No. 4,338, 244; U.S. Pat. No. 5,175,312; U.S. Pat. No. 5,216,052; U.S. Pat. No. 5,252,643; DE-A-431661 1; DE-A-4316622; DE-A-4316876; EP-A-0589839 or EP-A-0591102 or 3-[4-(2-acetoxyethoxy)phenyl]-5,7-di-tert-butyl-benzofuran-2-one, 5,7-di-tert-butyl-3-[4-(2-stearoyloxyethoxy) phenyl] benzofuran-2-one, 3,3'-bis[5,7-di-tert-butyl-3-(4-[2-hydroxyethoxy]phenyl)benzofuran-2-one]5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butyl-benzofuran-2-one.

These additional additives are conveniently added in amounts of 0.1–10% by weight, typically of 0.2–5% by weight, based on the polymer or copolymer to be stabilised.

In another of its aspects, this invention relates to the use of a light stabiliser mixture, which comprises a UV absorber c), a sterically hindered amine d) and an epoxidised fatty acid e) for light-stabilising a styrene, α-methylstyrene or p-methylstyrene homo- or copolymer finished with a bromine-containing flame retardant.

This invention also relates to a process for light-stabilising a styrene, α-methylstyrene or p-methylstyrene homo- or copolymer finished with a bromine-containing flame retardant, which comprises mixing a light stabiliser mixture, which comprises a UV absorber c), a sterically hindered amine d) and an epoxidised fatty acid e), with the homo- or copolymer and the flame retardant.

The above meanings and preferred meanings apply to the homo- or copolymers, the flame retardants, UV absorbers, sterically hindered amines and epoxidised fatty acids. The flame retardants, UV absorbers, sterically hindered amines and epoxidised fatty acids can be added to the polymer or copolymer individually in any succession or together as ready-made mixture.

Mixing devices are known and are mentioned above including their preferences.

Mixing is preferably carried out at elevated temperature, for example in the range from 50° to 300° C.

The following Examples illustrate the invention.

EXAMPLES A

Preparation of the Samples.

Example A1

In a first step, 15 parts of flame retardant Fl-1 are mixed with 4 parts of $Sb_2O_3$ in a dry mixer MTI-20, of Mischtechnik Industrie GmbH, at room temperature for 2 minutes. This mixture is then compounded with 100 parts of ABS Cycolac® TCA, of General Electric, in a twin-screw extruder, the following temperature profile being set in the extruder: zone 4 to zone 9 (die)=215° C., zone 1=500° C., zone 2=200° C. and zone 3=210° C. The polymer is added in zone 1, the flame retardant in zone 4. The extruded polymer is then granulated.

The light stabiliser mixture consisting of components c) UV absorber, d) sterically hindered amine and e) epoxidised fatty acid is dissolved in 4 ml of ethanol and applied to 100 g of the above-described granulate. The ethanol is volatilised over 15 h at 40° C. and 100 mbar. The granulate is then homogenised on a two-roll mill at 160 to 170° C. and at 14–16 rpm, to give films about 2 mm thick.

Components c) to e) and their amounts are given in Tables 1 and 2. 67 g each of the films so obtained are moulded to 210×210×2 mm plates at 185° C. in 3 min 15 sec at a pressure of about 250 bar. 45×40×2 mm samples for exposure are punched from these plates.

The exposure results are given in Table 1.

Example A2

The procedure of Example A1 is repeated, but using as polymer 100 parts of IPS Styron 5192®, of Dow, and incorporating 12 parts of flame retardant FL-1 with 4 parts of $Sb_2O_3$.

The exposure results are given in Table 2.

EXAMPLES B

Exposure Tests.

The samples are tested in a Weather-O-meter Ci 65, fitted with a 6500 watt xenon burner, according to ASTM D 4459–85. Intensity of irradiation=0.3 watt/$m^2$ at 340 nm, black pannel temperature=55° C., relative humidity=55%.

The colour difference value ΔE is determined according to DIN 6174 against the unexposed sample.

Tests B1–B4 are carried out using the polymer of Example A1.

TABLE 1

| Test No. | Stabiliser | % by weight | ΔE after 200 h | ΔE after 300 h |
| --- | --- | --- | --- | --- |
| B1 | none | | 11.7 | 14.8 |
| B2 | UV-1 | 0.50 | 2.9 | 4.1 |
| | HALS-1 | 0.25 | | |
| B3 | UV-1 | 0.50 | 3.1 | 4.2 |
| | EPOXI-1 | 0.25 | | |
| B4 | UV-1 | 0.50 | 2.8 | 3.7 |
| | HALS-1 | 0.125 | | |
| | EPOXI-1 | 0.125 | | |

Tests B5–B9 are carried out using the polymer of Example A2.

Tests B5–B9 are carried out using the polymer of Example A2.

TABLE 2

| Test No. | Stabiliser | % by weight | ΔE after 200 h | ΔE after 300 h |
| --- | --- | --- | --- | --- |
| B5 | none | | 19.7 | 22.8 |
| B6 | UV-1 | 0.50 | 2.7 | 5.3 |
| | HALS-1 | 0.25 | | |
| B7 | UV-1 | 0.50 | 5.7 | 7.4 |
| | EPOXI-1 | 0.25 | | |
| B8 | UV-1 | 0.50 | 2.7 | 4.8 |
| | HALS-1 | 0.125 | | |
| | EPOXI-1 | 0.125 | | |

Flame retardant FL-1: ethylene-bis-pentabromodiphenyl (Saytex® 8010, of Albemarle);

UV-1: Tinuvin P® (2-(2'-hydroxy-5'-methylphenyl) benzotriazole), of Ciba Specialty Chemicals;

HALS-1: sterically hindered amine, Chimasorb® 119 (the condensate of 2-chloro-4,6-di(4-n-butylamino-1,2,2,6, 6-pentamethylpiperidyl)-1,3,5-triazine and 1,2-bis(3-aminopropylamino)ethane), of Ciba Specialty Chemicals;

EPOXI-1: Reoplast 39® (epoxidised soy bean oil), of Ciba Specialty Chemicals.

What is claimed is:

1. A composition, which comprises a) a styrene, α-methylstyrene or p-methylstyrene homo- or copolymer, b) a bromine-containing flame retardant, c) a UV absorber, d) a sterically hindered amine and e) an epoxidised fatty acid.

2. A composition according to claim 1, wherein component a) is polystyrene, poly(p-methylstyrene) or poly(α-methylstyrene).

3. A composition according to claim 1, wherein component a) is a copolymer of styrene or α-methylstyrene with diene or acryl monomers.

4. A composition according to claim 1, wherein component a) is an acrylonitrite/butadiene/styrene (ABS) copolymer or impact-modified polystyrene.

5. A composition according to claim 1, wherein the flame retardant b) is decabromodiphenyl oxide, octabromodiphenyl oxide, tetrabromodiphenyl oxide, tetrabromobisphenol A, hexabromocyclododecane, bis(tribromophenoxy)ethane, tribromophenol, ethylene-bis-tetrabromophthalimide, tetrabromobisphenol A polycarbonate oligomer, polystyrene bromide, tetrabromobisphenol A epoxy oligomer, ethylene-bis-pentabromodiphenyl or tris(tribromophenoxy)triazine.

6. A composition according to claim 5, wherein the flame retardant b) is ethylene-bis-pentabromodiphenyl or ethylene-bis-tetrabromophthalimide.

7. A composition according to claim 1, which additionally comprises $Sb_2O_3$ or $Sb_2O_5$.

8. A composition according to claim 1, wherein component c) is a UV absorber from the group of the 2-(2'-hydroxyphenyl)benzotriazoles or 2-(2-hydroxyphenyl)-1,3, 5-triazines.

9. A composition according to claim 8, wherein component c) is 2-(2'-hydroxy-5'-methylphenyl)benzotriazole, 2-(3',5'-di-tert-amyl-2'-hydroxyphenyl)benzotriazole or 2-(3',5'-bis(α,α-dimethylbenzyl)-2'-hydroxyphenyl) benzotriazole.

10. A composition according to claim 1, wherein the sterically hindered amine d) is a compound containing one or more than one group of formula

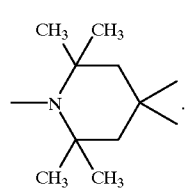

(I)

11. A composition according to claim 1, wherein component d) is bis(2,2,6,6-tetramethylpiperidin-4-yl)sebacate, bis (2,2,6,6-tetramethylpiperidin-4-yl)succinate, bis(1,2,2,6,6-pentamethylpiperidin-4-yl)sebacate, the condensate of 2-chloro-4,6-di-(4-n-butylamino-2,2,6,6-tetramethylpiperidyl)-1,3,5-triazine and 1,2-bis(3-aminopropylamino)ethane or the condensate of 2-chloro-4, 6-di-(4-n-butylamino-1,2,2,6,6-pentamethylpiperidyl)-1,3, 5-triazine and 1,2-bis(3-aminopropylamino)ethane.

12. A composition according to claim 1, wherein component e) is epoxidised soy bean oil, epoxidised castor oil, epoxidised sunflower oil, epoxidised linseed oil, epoxidised fish oil or epoxidised tallow.

13. A composition according to claim 1, which comprises the UV absorbers c) in an amount of 0.1 to 5% by weight, based on the polymer.

14. A composition according to claim 1, which comprises the sterically hindered amines d) in an amount of 0.05 to 3% by weight, based on the polymer.

15. A composition according to claim 1, which comprises the epoxidised fatty acids e) in an amount of 0.01 to 5% by weight, based on the polymer.

16. A process for light-stabilising a styrene, α-methylstyrene or p-methylstyrene homo- or copolymer finished with a bromine-containing flame retardant, which comprises mixing a UV absorber c), a sterically hindered amine d) and an epoxidised fatty acid e) with the polymer or copolymer and the flame retardant.

\* \* \* \* \*

UNITED STATES PATENT AND TRADEMARK OFFICE
CERTIFICATE OF CORRECTION

PATENT NO.    : 6,228,911 B1
DATED         : May 8, 2001
INVENTOR(S)   : Bernard Gilg It is certified that error appears in the above-identified patent and that said Letters Patent is hereby corrected as shown below:

<u>Title page,</u>
Item [22], should read -- [22] PCT Filed: Dec. 11, 1997 --.

Signed and Sealed this

Twenty-sixth Day of February, 2002

Attest:

Attesting Officer

JAMES E. ROGAN
*Director of the United States Patent and Trademark Office*